(12) United States Patent
Boehm et al.

(10) Patent No.: US 12,248,314 B2
(45) Date of Patent: Mar. 11, 2025

(54) ACTIVATING AN AUTOMATED PARKING MANEUVER BY WAY OF AN ACTIVATION MOVEMENT CARRIED OUT BY A MOBILE COMMUNICATIONS DEVICE

(71) Applicant: Bayerische Motoren Werke Aktiengesellschaft, Munich (DE)

(72) Inventors: Sophie Boehm, Munich (DE); Rolf Brenndoerfer, Wolfratshausen (DE); Patrick Heinrich, Manching (DE); Yordan Mihaylov, Munich (DE); Jordi Sabater, Oberschleissheim (DE); Konstantin Zhukov, Unterschleissheim (DE); Andreas Von Eichhorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 17/925,384

(22) PCT Filed: Apr. 15, 2021

(86) PCT No.: PCT/EP2021/059765
§ 371 (c)(1),
(2) Date: Nov. 15, 2022

(87) PCT Pub. No.: WO2021/233612
PCT Pub. Date: Nov. 25, 2021

(65) Prior Publication Data
US 2023/0185298 A1    Jun. 15, 2023

(30) Foreign Application Priority Data
May 18, 2020   (DE) ..................... 10 2020 113 382.0

(51) Int. Cl.
*G05D 1/00* (2024.01)
*B60W 30/06* (2006.01)
(Continued)

(52) U.S. Cl.
CPC ........... *G05D 1/0016* (2013.01); *B60W 30/06* (2013.01); *G06F 3/017* (2013.01); *G06F 3/0346* (2013.01); *B60W 2556/45* (2020.02)

(58) Field of Classification Search
CPC ................ G05D 1/0016; B60W 30/06; B60W 2556/45; G06F 3/017; G06F 3/0346; G06F 2218/12; G06V 20/56; B62D 15/0285
See application file for complete search history.

(56) References Cited

U.S. PATENT DOCUMENTS

2015/0375741 A1*  12/2015  Kiriya ................... G06V 40/28
                                                        701/2
2017/0168479 A1    6/2017   Dang Van Nhan
(Continued)

FOREIGN PATENT DOCUMENTS

| CN | 105916758 A | 8/2016 |
| CN | 107757610 A | 3/2018 |

(Continued)

OTHER PUBLICATIONS

International Search Report (PCT/ISA/210) issued in PCT Application No. PCT/EP2021/059765 dated Jul. 12, 2021 with English translation (four (4) pages).

(Continued)

*Primary Examiner* — Abby Y Lin
*Assistant Examiner* — Dylan M Katz
(74) *Attorney, Agent, or Firm* — Crowell & Moring LLP

(57) ABSTRACT

A method for activating an automated parking maneuver to be carried out via a parking assistance system with a motor vehicle is provided. The parking assistance system can be (Continued)

operated remotely from outside the motor vehicle by way of a mobile communications device. The method includes outputting an instruction via the mobile communications device for the user-side execution of a predefined activation movement of the mobile communications device; determining first sensor information relating to the activation movement of the communications device by way of a communications-device-side sensor system; detecting an activation movement of the mobile communications device carried out by the mobile communications device based on the first sensor information; and activating the parking maneuver according to the detection of the activation movement of the mobile communications device.

16 Claims, 3 Drawing Sheets

(51) Int. Cl.
  *G06F 3/01* (2006.01)
  *G06F 3/0346* (2013.01)

(56) References Cited

U.S. PATENT DOCUMENTS

| | | | |
|---|---|---|---|
| 2017/0225679 A1* | 8/2017 | Bonnet | B62D 15/0285 |
| 2018/0039264 A1 | 2/2018 | Messner et al. | |
| 2018/0050689 A1 | 2/2018 | Unveren et al. | |
| 2019/0310624 A1* | 10/2019 | Bettger | B62D 15/0285 |
| 2021/0284137 A1* | 9/2021 | Nakagawa | G07C 5/0808 |

FOREIGN PATENT DOCUMENTS

| | | |
|---|---|---|
| CN | 110386135 A | 10/2019 |
| DE | 10 2012 200 725 A1 | 7/2013 |
| DE | 10 2012 212 260 A1 | 1/2014 |
| DE | 10 2013 012 394 A1 | 1/2015 |
| DE | 10 2014 115 334 A1 | 4/2016 |
| DE | 10 2015 208 123 A1 | 10/2016 |
| DE | 10 2015 208 124 A1 | 10/2016 |
| DE | 10 2015 209 976 A1 | 12/2016 |
| DE | 10 2016 226 008 A1 | 6/2018 |
| DE | 10 2017 200 371 A1 | 7/2018 |
| WO | WO 2013/053776 A2 | 4/2013 |
| WO | WO 2015/127167 A1 | 8/2015 |
| WO | WO 2021/084978 A1 | 5/2021 |

OTHER PUBLICATIONS

German-language Written Opinion (PCT/ISA/237) issued in PCT Application No. PCT/EP2021/059765 dated Jul. 12, 2021 (seven (7) pages).

German-language Search Report issued in German Application No. 10 2020 113 382.0 dated Feb. 26, 2021 with partial English translation (11 pages).

Chinese-language Office Action issued in Chinese Application No. 202180033969.7 dated Nov. 15, 2024 (9 pages).

* cited by examiner

ACTIVATING AN AUTOMATED PARKING MANEUVER BY WAY OF AN ACTIVATION MOVEMENT CARRIED OUT BY A MOBILE COMMUNICATIONS DEVICE

BACKGROUND AND SUMMARY OF THE INVENTION

The invention relates to parking assistance systems for performing automated parking maneuvers, which parking assistance systems are remotely controllable from outside a motor vehicle by way of a mobile communication device (e.g. smartphone having suitable smartphone software).

Parking assistance systems for automated parking that are controllable by mobile communication device are known, e.g. for parking in a perpendicular parking space (for example a single garage that can be entered at the front). These involve the mobile communication device being connected to the motor vehicle by radio directly (e.g. by Bluetooth) or indirectly (e.g. via a mobile radio network). If the vehicle has been stopped in front of a perpendicular parking space, for example, the operator can have the vehicle park in the parking space from outside the vehicle by operating the mobile communication device. Depending on the implementation of the system, the remote control can be used for example to start and stop the automatic parking maneuver or to select the direction of travel. The parking assistance system automatically controls the drive torque, the service brake, the gear selection and the steering, for example.

The document WO 2013/053776 A2 describes a parking assistance system controllable by remote control for automatically parking in a perpendicular parking space, the remote control comprising a control element for controlling forward travel and a control element for controlling reverse travel. If the vehicle has been stopped in front of a perpendicular parking space, the operator can steer the vehicle into the parking space from outside the vehicle using automated longitudinal guidance and automated lateral guidance by operating the control element for controlling forward travel.

Further parking assistance systems for automated parking that are controllable from outside a motor vehicle by mobile communication device are described in the documents DE 102015209976 A1, DE 102015208123 A1, DE 102015208124 A1 and DE 102016226008 A1.

If a mobile communication device in the form of a commercially available smartphone having a touch-sensitive screen (touchscreen) and suitable mobile application software (app) for controlling the vehicle function is used for the remote control, it is necessary to ensure that the remote control using such a smartphone is reliable. By way of example, no erroneous input information for performing the driving function must be sent to the vehicle system if the operator does not perform an appropriate input on the touchscreen.

It is an object of the invention to make an automated parking process with a remotely controllable (in particular by smartphone) parking assistance system particularly reliable.

The object is achieved by the claimed invention. It is pointed out that additional features of a patent claim that is dependent on an independent patent claim may, without the features of the independent patent claim or just in combination with a subset of the features of the independent patent claim, form a separate invention that is independent of the combination of all of the features of the independent patent claim and that can be turned into the subject matter of an independent claim, of a divisional application or of a subsequent application. This applies in the same way to technical teachings described in the description that are able to form an invention independent of the features of the independent patent claims.

A first aspect of the invention relates to a method for activating an automated parking maneuver with a motor vehicle (in particular motorcar) that can be performed using a parking assistance system. The parking assistance system is remotely controllable from outside the motor vehicle by way of a mobile communication device (in particular smartphone). The method comprises the following steps:

- outputting an instruction via the mobile communication device (e.g. on the touch-sensitive screen) for the user to perform a predefined activation movement of the mobile communication device (e.g. tilting the device into a specific attitude);
- determining first sensor information (e.g. acceleration information, rotation rate information, magnetic field information) that is sensitive to the activation movement of the communication device (i.e. reacts to the activation movement) by way of a communication-device sensor system (e.g. acceleration sensor, gyroscope, magnetometer);
- detecting an activation movement of the mobile communication device that is performed with the mobile communication device, based on the first sensor information; and
- activating the parking maneuver on the basis of the detection of the activation movement of the mobile communication device.

There may be provision for identification of the activation movement to be already followed by initiation of vehicle functions that prepare for the parking maneuver, for example the parking brake is released and the drive motor is started. The start of movement of the vehicle for the parking maneuver may also require further control actions by the user (or the existence of other conditions) besides the activation movement that has taken place, for example touching the screen of a smartphone used for remote control in a predefined manner (e.g. performing a predefined circular movement on the screen or touching the screen in a predefined screen area).

It is advantageous if, before an instruction to perform the activation movement of the mobile communication device is output, one or more control actions by the user are necessary on the mobile communication device, e.g. starting an app on the smartphone, selecting a parking function in the app, selecting a parking maneuver presented via the app, operating a predefined area ("Continue") on the smartphone screen.

The method according to embodiments of the invention is based on the idea that the user needs to perform a predefined activation gesture with the mobile communication device, e.g. needs to tilt a smartphone in a predefined manner, in order to activate the parking maneuver. This significantly reduces and, depending on the complexity of the activation gesture, almost prevents the probability of undesirable activation of the parking maneuver.

In principle, it is known practice from the prior art to increase reliability during an automated parking maneuver by determining sensor information by way of a smartphone sensor system (e.g. an acceleration sensor), and to make continuation of the parking maneuver dependent on the captured sensor information. The sensor information is preferably transmitted to the vehicle onboard parking assistance system, which influences the performance of the parking maneuver on the basis of the sensor information. If, during the parking maneuver, the captured acceleration information indicates that the smartphone falls or is vigorously shaken during the parking maneuver, for example, the parking maneuver can be immediately stopped by the parking assistance system.

If there is also provision for such an approach when an embodiment of the invention is applied, the activation movement to be performed can serve two purposes:

1. As already discussed above: increasing reliability by making the activation of the parking maneuver dependent on the performance of an activation movement with the mobile communication device, according to embodiments of the invention.
2. And additionally: checking that the communication-device sensor system is operational and, if necessary, that the sensor information is provided to the parking assistance system correctly via a direct or indirect communication connection.

That is to say that the activation movement then serves two purposes simultaneously if second sensor information (e.g. acceleration information) of the same information type (e.g. acceleration information) as the first sensor information (e.g. acceleration information) is determined by way of the communication-device sensor system (e.g. acceleration sensor system) during the automated parking maneuver, and the performance of the parking maneuver is dependent on the second sensor information.

The predefined activation movement preferably comprises a tilting movement, preferably about an axis parallel to the transverse extent (or longitudinal extent) of the screen of a smartphone, provided that the associated app of the smartphone is an app in portrait format (or landscape format).

The predefined activation movement advantageously comprises a tilting movement into a predefined attitude. It is not absolutely necessary in this case for the tilting movement as such to be identified (for example by evaluating rotation rate information from an integrated gyroscope). By way of example, it suffices if a specific criterion regarding arrival at the predefined attitude is satisfied.

Preferably, the activation movement comprises a tilting of the smartphone into a first attitude, in which the screen plane of the smartphone is substantially parallel to Earth's surface and the screen is on the side of the smartphone that is remote from Earth's surface. In this instance, there may be provision for it not to be absolutely necessary for the user to tilt the smartphone right into the first attitude, but rather for a mere tilting into an attitude before the first attitude to be accepted (e.g. with an angle of 20 degrees between the screen plane and Earth's surface).

Alternatively or additionally, the activation movement comprises a tilting of the smartphone into a second attitude, in which the screen plane of the smartphone is substantially perpendicular to Earth's surface, in particular the height extent of the screen of the smartphone is perpendicular to Earth's surface (the top of the smartphone being directed upward) in the case of an app in portrait format. In this instance, there may be provision for it not to be absolutely necessary for the user to tilt the smartphone right into the second attitude, but rather for a mere tilting into an attitude before the second attitude to be accepted (e.g. with an angle of 70 degrees between the screen plane and Earth's surface).

It is advantageous if the activation movement comprises at least two partial movements, specifically a tilting into the first attitude and then a tilting into the second attitude, or vice versa. In this case, it would be conceivable to take the starting orientation of the smartphone as a basis for deciding whether the smartphone initially needs to be tilted into the first or into the second attitude, the smartphone subsequently needing to be tilted into the other attitude.

In this case, it would also be conceivable for the activation movement to comprise for example at least three partial movements, for example a tilting into the first attitude, then a tilting into the second attitude and subsequently a tilting into the first attitude again (or alternatively a tilting into the second attitude, then a tilting into the first attitude and subsequently a tilting into the second attitude again).

The step of outputting an instruction to perform the activation movement may comprise at least two substeps, for example:

before the tilting into the first attitude, outputting an instruction to tilt the smartphone into the first attitude; and before the tilting into the second attitude, outputting an instruction to tilt the smartphone into the second attitude.

In a preferred exemplary embodiment, the smartphone comprises:

an X-direction acceleration sensor for ascertaining X-direction acceleration information in the X-direction parallel to the width extent of the screen, a Y-direction acceleration sensor for ascertaining Y-direction acceleration information in the Y-direction parallel to the height extent of the screen, and a Z-direction acceleration sensor for ascertaining Z-direction acceleration information in the Z-direction orthogonal to the screen plane.

In this case, the detecting of an activation movement is broken down into at least two subdetections:

1. detecting the tilting of the smartphone into the first attitude, the step of detecting the tilting into the first attitude comprising:
   a. checking whether the Y-direction acceleration information satisfies a first criterion (e.g. the measured acceleration in the Y direction is less than or less than or equal to a first threshold value $a_{low}$), in particular for a period of time greater than or greater than or equal to a temporal threshold value (e.g. 1 s), and
   b. checking whether the Z-direction acceleration information satisfies a second criterion (e.g. the measured acceleration in the Z direction is greater than or greater than or equal to a first threshold value $a_{up}$), in particular for a period of time greater than or greater than or equal to a threshold value (e.g. 1 s), and
2. detecting the tilting of the smartphone into the second attitude, the step of detecting the tilting into the second attitude comprising:
   a. checking whether the Y-direction acceleration information satisfies the second criterion (e.g. the measured acceleration in the Y direction is greater than or greater than or equal to the first threshold value $a_{up}$), in particular for a period of time greater than or greater than or equal to a threshold value (e.g. 1 s), and
   b. checking whether the Z-direction acceleration information satisfies the first criterion (e.g. the measured acceleration in the Z direction is less than or less than or equal to a first threshold value $a_{low}$), in particular for a period of time greater than or greater than or equal to a threshold value (e.g. 1 s).

If the smartphone needs to be put into only one of the two attitudes for the activation movement, only one of the two subdetections 1. and 2. described above is performed.

In principle, to increase reliability, it is advantageous if the activation movement is not detected by the smartphone itself, but rather the first sensor information captured by the smartphone is transmitted to the vehicle onboard parking assistance system via a wireless communication connection (e.g. by Bluetooth or by mobile radio network, in the second case also via an interposed backend server if necessary), and the activation movement is detected by the vehicle onboard parking assistance system based on the transmitted first sensor information.

A second aspect relates to a vehicle onboard parking assistance system for performing an automated parking maneuver, which system is remotely controllable (from outside a motor vehicle by way of a mobile communication device), the parking maneuver being activable on the basis of a predefined user-induced activation movement of the mobile communication device.

The system is configured to perform various actions, which are described below. This is typically effected by way of one or more electronic control units that operate in a manner according to embodiments of the invention under the control of one or more software programs.

The parking assistance system according to embodiments of the invention is configured:
- to receive first sensor information that is sensitive to the activation movement and has been determined by way of a communication-device sensor system,
- to detect an activation movement of the mobile communication device based on the first sensor information, and
- to activate the parking maneuver on the basis of the detection of the activation movement.

The above statements pertaining to the method according to the invention based on the first aspect of the invention also apply in a corresponding manner to the parking assistance system according to the invention based on the second aspect of the invention. Advantageous exemplary embodiments of the parking assistance system according to the invention that are not explicitly described at this juncture and in the patent claims correspond to the advantageous exemplary embodiments of the method according to the invention that are described above or in the patent claims.

A third aspect of the invention relates to software for a software-controlled vehicle onboard parking assistance system having program code for performing one or more steps of the method according to the first aspect of the invention when the software runs on the software-controlled vehicle onboard parking assistance system.

The software for the vehicle onboard parking assistance system is used for example to perform the following steps of the method according to embodiments of the invention:
- detecting an activation movement of the mobile communication device that is performed with the mobile communication device, based on the first sensor information; and
- activating the parking maneuver on the basis of the detection of the activation movement of the mobile communication device.

A fourth aspect of the invention relates to software for a software-controlled mobile communication device, in particular an app (provided via a digital sales platform for a plurality of apps) for a smartphone, having program code for performing one or more steps of the method according to the first aspect of the invention when the software runs on the software-controlled mobile communication device.

The software for the mobile communication device is used for example to perform the following steps of the method according to embodiments of the invention:
- outputting an instruction via the mobile communication device for the user to perform a predefined activation movement of the mobile communication device; and
- determining first sensor information that is sensitive to the activation movement of the communication device by way of a communication-device sensor system.

The invention is described below on the basis of an exemplary embodiment with the aid of the accompanying drawings.

DETAILED DESCRIPTION OF THE DRAWINGS

Figure 1:
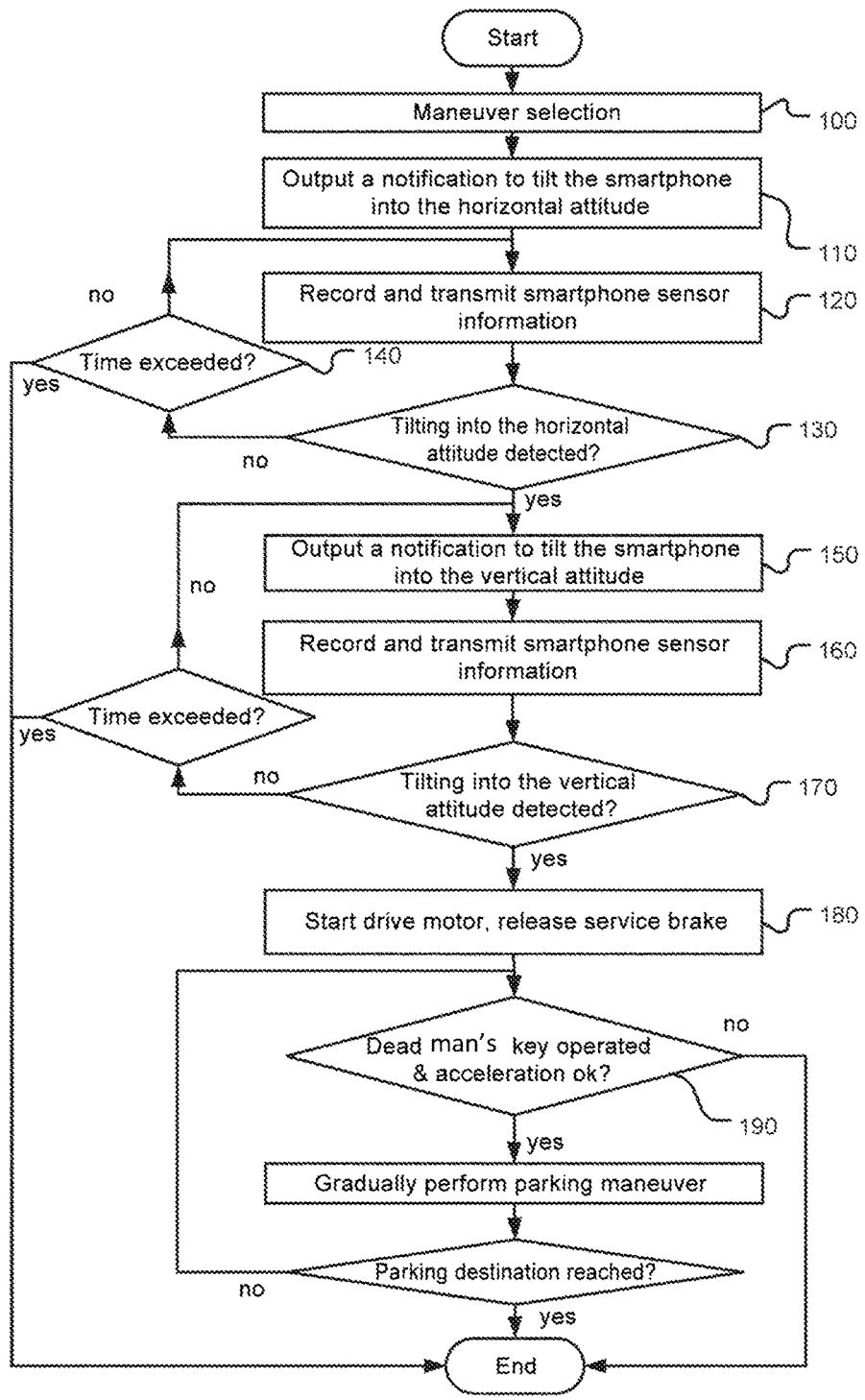
FIG. 1 shows an illustrative flowchart for a method according to an embodiment of the invention.

FIG. 1 shows an illustrative flowchart for a method according to an embodiment of the invention for activating an automated parking maneuver. The parking assistance system is remotely controllable outside the motor vehicle by way of a smartphone. An app is installed on the smartphone to remotely control the parking assistance system.

Figure 2:
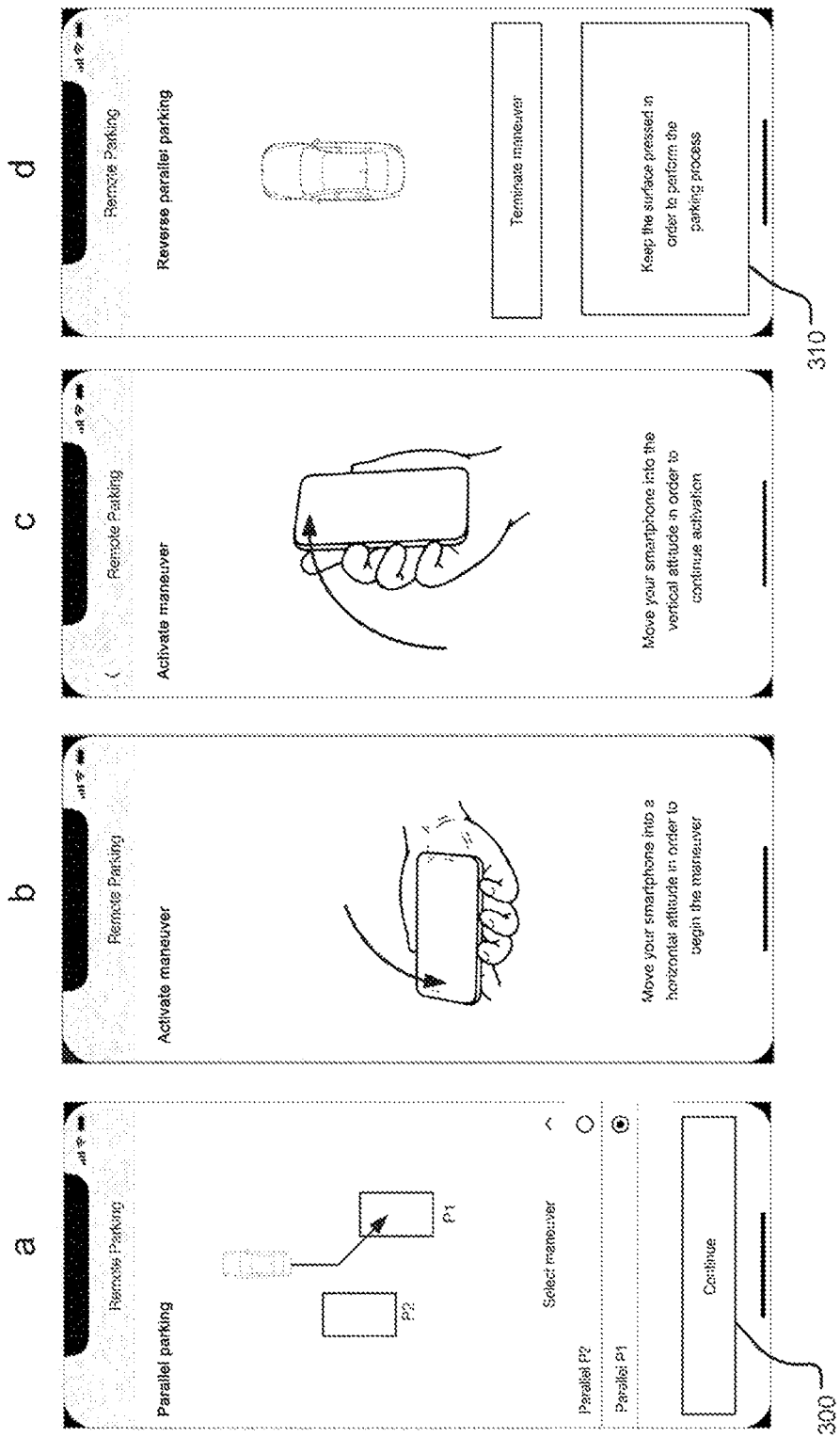
FIG. 2 shows illustrative screen outputs on a smartphone.

In step 100, a maneuver selection is made by the user using the smartphone. FIG. 2a shows an illustrative user interface for maneuver selection in portrait format that is shown on the touch-sensitive screen of the smartphone. In this parking situation, the user is offered two usable parking spaces P1 and P2 for selection. When the user has selected a parking maneuver and the user has touched the Continue control panel 300, preparations are made to activate the parking maneuver.

To this end, in step 110, the user is provided with an instruction via the smartphone to tilt the smartphone into a first, horizontal attitude parallel to Earth's surface with the screen side upward. A corresponding screen output on the smartphone is shown in FIG. 2b (see the horizontal attitude of the smartphone and the arrow indicating the tilting movement). The instruction to tilt the smartphone into the horizontal attitude may also be in the form of an animation. In the case of a multipart movement (here tilting into a horizontal attitude and then tilting into a vertical attitude), the animation may already show the whole movement or may just show the first partial movement.

In step 120, acceleration information is captured in the smartphone by way of the smartphone acceleration sensor system and is transmitted to the vehicle onboard parking assistance system via a wireless communication connection (e.g. Bluetooth).

The smartphone acceleration sensor system comprises:
- an X-direction acceleration sensor for ascertaining an X-direction acceleration $a_x$ in the X-direction parallel to the width extent of the screen,
- a Y-direction acceleration sensor for ascertaining a Y-direction acceleration $a_y$ in the Y-direction parallel to the height extent of the screen, and
- a Z-direction acceleration sensor for ascertaining a Z-direction acceleration $a_z$ in the Z-direction orthogonal to the screen plane.

The acceleration is an acceleration taking account of gravitational acceleration g, i.e. the acceleration sensor also sees gravitational acceleration, and so an idle acceleration sensor always shows an acceleration of 1 g ($\approx 9.81$ m/s$^2$) when the measuring direction of the sensor is oriented parallel to gravitational acceleration.

In step 130, a check is performed in the vehicle onboard parking assistance system to determine whether the smartphone has been tilted into a horizontal attitude.

To detect the tilting of the smartphone into the horizontal attitude, a check is performed to determine:

a) whether the Y-direction acceleration $a_y$ is less than a lower threshold value $a_{low}$ (with $a_{low}$<0.5 g, e.g. $a_{low}$=0.1 g) (i.e. $a_y$<$a_{low}$), specifically for an uninterrupted period of time greater than a temporal threshold value ΔT, and b) whether the Z-direction acceleration $a_z$ is greater than an upper threshold value $a_{up}$ (with $a_{up}$>0.5 g, e.g. $a_{up}$=0.9 g) (i.e. $a_z$>$a_{up}$), specifically for an uninterrupted period of time greater than the temporal threshold value ΔT.

Figure 3:
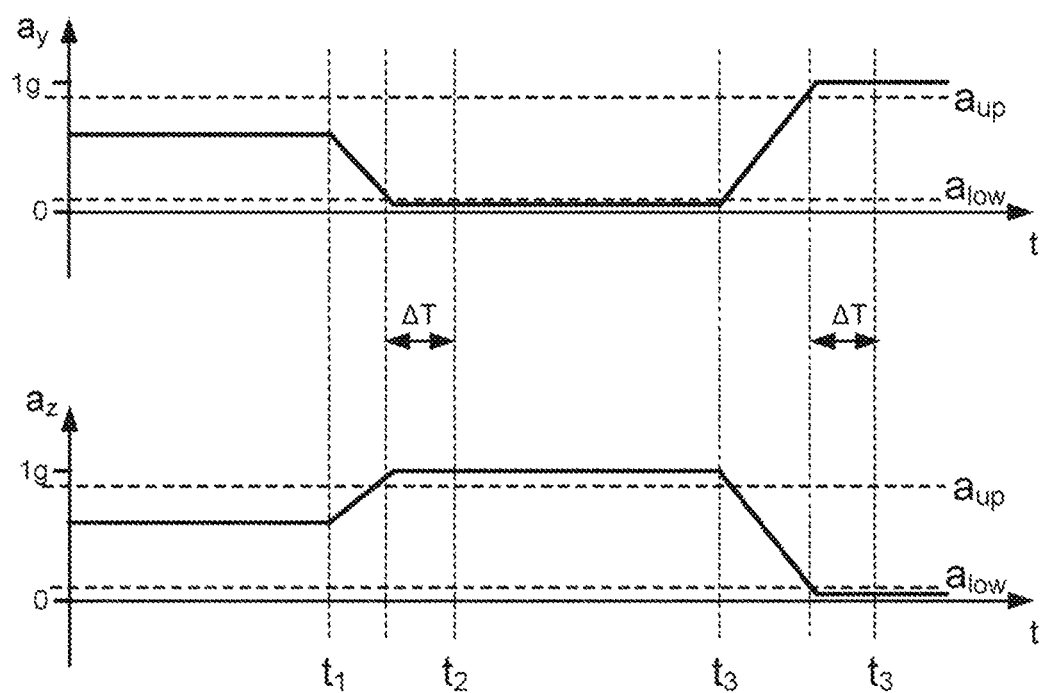
FIG. 3 shows illustrative sensor signals from the smartphone acceleration sensor system.

If both conditions a) and b) are met, this is used to detect a tilting of the smartphone into the horizontal attitude. FIG. 3 shows illustrative characteristics for the Y-direction acceleration $a_y$ in the Y direction parallel to the height extent of the screen and for the Z-direction acceleration $a_z$ in the Z direction orthogonal to the screen plane. Before the time $t_1$, the user holds the smartphone at an angle in front of him so that the user looks at the screen at an angle from above. At the time $t_1$, the user begins to tilt the smartphone (with a tilting movement about an axis substantially parallel to the transverse extent of the screen of the smartphone) into an approximately horizontal position (with the screen pointing away from Earth's surface). The Y-direction acceleration $a_y$ decreases toward zero and the Z-direction acceleration $a_z$ increases toward 1 g. At the time $t_2$, it is found that the Y-direction acceleration $a_y$ has already been less than the lower threshold value $a_{low}$ and the Z-direction acceleration $a_z$ greater than the upper threshold value $a_{up}$ for an uninterrupted period of time greater than ΔT. This is used to identify that the smartphone has been tilted into a substantially horizontal attitude (with the screen pointing away from Earth's surface).

If no horizontal attitude has been detected in step 130 in FIG. 1, the check for arrival at a horizontal attitude is continued until a predefined time has been exceeded (see test 140 "time exceeded").

If a horizontal attitude has been detected in step 130, an instruction to tilt the smartphone into the vertical attitude (with the top of the smartphone upward) is output to the user in step 150. A corresponding screen output on the smartphone is shown in FIG. 2c (see the vertical attitude of the smartphone and the arrow indicating the tilting movement).

In step 160, as in step 120, acceleration information is captured in the smartphone by way of the smartphone acceleration sensor system and is transmitted to the vehicle onboard parking assistance system via a wireless communication connection (e.g. Bluetooth).

In step 170, a check is performed in the vehicle onboard parking assistance system to determine whether the smartphone has been tilted into the vertical attitude.

To detect the tilting of the smartphone into the vertical attitude, a check is performed to determine:

c) whether the Y-direction acceleration $a_y$ is greater than the upper threshold value $a_{up}$, specifically for an uninterrupted period of time greater than a temporal threshold value ΔT, and d) whether the Z-direction acceleration $a_z$ is less than the lower threshold value $a_{low}$ (i.e. $a_z$>$a_{up}$), specifically for an uninterrupted period of time greater than the temporal threshold value ΔT.

If both conditions c) and d) are met, this is used to detect the tilting of the smartphone into the vertical attitude.

In FIG. 3, the user begins to tilt the smartphone from the horizontal attitude into the vertical attitude at the time $t_3$. The Y-direction acceleration $a_y$ decreases toward zero and the Z-direction acceleration $a_z$ increases toward 1 g. At the time $t_4$, it is found that the Y-direction acceleration $a_y$ has been greater than the upper threshold value $a_{up}$ and the Z-direction acceleration $a_z$ less than the lower threshold value $a_{low}$ for a period of time greater than ΔT. This is used to identify that the smartphone has been tilted into a substantially vertical attitude.

If a vertical attitude has been detected in step 170, the user has performed the predefined whole activation movement and the parking maneuver is activated. To this end, the drive motor is initially started and the service brake released in step 180. To begin the movement for the parking maneuver, step 190 also requires a dead man's key to be operated, operation of the dead man's key needing to be continued during the parking maneuver in order to prevent the parking maneuver from being terminated. To this end, activation of the parking maneuver results in an area 310 on the screen of the smartphone (see FIG. 2d) being marked that acts as a dead man's key and needs to be continuously touched by the user.

Furthermore, the X-direction acceleration $a_x$, Y-direction acceleration $a_y$ and Z-direction acceleration $a_z$ are regularly transmitted to the vehicle onboard parking assistance system during the parking maneuver. Continuation of the parking maneuver is dependent on this transmitted acceleration information. If, during the parking maneuver, the transmitted acceleration information indicates that the smartphone falls or the smartphone is vigorously shaken during the parking maneuver, for example, the parking maneuver is immediately stopped by the parking assistance system.

The detection of the activation movement by way of the acceleration sensor system of the smartphone is also used to check that the smartphone acceleration sensor system is operational and that the acceleration information is provided to the parking assistance system correctly via the communication connection before the parking maneuver already.

In the exemplary embodiment, the activation gesture has been detected only by evaluating the Y-direction acceleration $a_y$ and the Z-direction acceleration $a_z$. However, it would be conceivable to detect the two-part tilt activation gesture described above by also making demands on the X-direction acceleration $a_x$, in order to also check the X-direction acceleration sensor (for example $a_x$<$a_{low}$ during the whole two-part tilt gesture). Alternatively or additionally, the tilt activation gesture could be extended in order to check the X-direction acceleration sensor by detecting a change in the signal from the X-direction acceleration sensor (e.g. tilting of the smartphone into a landscape orientation).

The invention claimed is:

1. A method for activating an automated parking maneuver with a motor vehicle that is performable with a parking assistance system, the parking assistance system being remotely controllable from outside the motor vehicle by way of a mobile communication device, the method comprising:
outputting an instruction via the mobile communication device for a user to perform a predefined activation movement of the mobile communication device;

determining first sensor information that is sensitive to the activation movement of the mobile communication device by a communication-device sensor system;

detecting the activation movement of the mobile communication device that is performed with the mobile communication device, based on the first sensor information; and activating the parking maneuver based on the detecting of the activation movement of the mobile communication device, wherein the activation movement comprises a tilting movement of the mobile communication device into a predefined first attitude.

2. The method according to claim 1, wherein second sensor information of a same information type as the first sensor information is determined by the communication-device sensor system during the parking maneuver, and performance of the parking maneuver is dependent on the second sensor information.

3. The method according to claim 1, wherein the communication device is a smartphone having a touch-sensitive screen.

4. The method according to claim 3, wherein in the first attitude, a screen plane of the smartphone is substantially parallel to Earth's surface.

5. The method according to claim 4, wherein the activation movement further comprises a tilting of the smartphone into a second attitude, in which the screen plane of the smartphone is substantially perpendicular to Earth's surface.

6. The method according to claim 5, wherein in the second attitude, a height extent of the screen is substantially perpendicular to Earth's surface.

7. The method according to claim 5, wherein the activation movement comprises the tilting into the first attitude and then the tilting into the second attitude, or vice versa.

8. The method according to claim 7, wherein the outputting of the instruction to perform the activation movement comprises:
before the tilting into the first attitude, outputting a first instruction to tilt the smartphone into the first attitude; and
before the tilting into the second attitude, outputting a second instruction to tilt the smartphone into the second attitude.

9. The method according to claim 5, wherein the first sensor information is acceleration information captured with an acceleration sensor system.

10. The method according to claim 9, wherein:
the smartphone comprises:
an X-direction acceleration sensor for ascertaining X-direction acceleration information in an X-direction parallel to a width extent of the screen,
a Y-direction acceleration sensor for ascertaining Y-direction acceleration information in a Y-direction parallel to the height extent of the screen, and
a Z-direction acceleration sensor for ascertaining Z-direction acceleration information in a Z-direction orthogonal to the screen plane; and
the detecting of the activation movement comprises:
detecting the tilting of the smartphone into the first attitude, the detecting of the tilting of the smartphone into the first attitude comprising:
checking whether the Y-direction acceleration information satisfies a first criterion for a period of time greater than or greater than or equal to a temporal threshold value, and
checking whether the Z-direction acceleration information satisfies a second criterion for the period of time greater than or greater than or equal to the temporal threshold value, or
detecting the tilting of the smartphone into the second attitude, the detecting of the tilting of the smartphone into the second attitude comprising:
checking whether the Y-direction acceleration information satisfies a third criterion for the period of time greater than or greater than or equal to the temporal threshold value, and
checking whether the Z-direction acceleration information satisfies a fourth criterion for the period of time greater than or greater than or equal to the temporal threshold value.

11. The method according to claim 10, wherein the third criterion is the second criterion and the fourth criterion is the first criterion.

12. The method according to claim 1, further comprising:
transmitting the first sensor information to the parking assistance system via a wireless communication connection,
wherein the activation movement is detected by the parking assistance system.

13. The method according to claim 1, wherein the activation movement comprises at least two predefined partial activation movements.

14. The method according to claim 1, wherein:
the detecting of the activation movement of the mobile communication device that is performed with the mobile communication device comprises checking a criterion regarding arrival at the first attitude of the mobile communication device for the activation movement.

15. A parking assistance system for performing an automated parking maneuver, wherein:
the parking assistance system is remotely controllable from outside a motor vehicle by way of a mobile communication device,
the parking maneuver is activatable based on a predefined user-induced activation movement of the mobile communication device,
the activation movement comprises a tilting movement of the mobile communication device into a predefined first attitude, and
the parking assistance system is configured:
to receive first sensor information that is sensitive to the activation movement and has been determined by a communication-device sensor system,
to detect the activation movement of the mobile communication device based on the first sensor information, and
to activate the parking maneuver based on the detection of the activation movement.

16. A computer product comprising a non-transitory computer readable medium having stored thereon program code which, when executed on a processor of the mobile communication device, carries out the method according to claim 1.

* * * * *